(12) United States Patent
Biswas et al.

(10) Patent No.: US 11,086,534 B2
(45) Date of Patent: Aug. 10, 2021

(54) MEMORY DATA DISTRIBUTION BASED ON COMMUNICATION CHANNEL UTILIZATION

(71) Applicant: Apple Inc., Cupertino, CA (US)

(72) Inventors: Sukalpa Biswas, Fremont, CA (US); Thejasvi Magudilu Vijayarai, San Jose, CA (US)

(73) Assignee: Apple Inc., Cupertino, CA (US)

( * ) Notice: Subject to any disclaimer, the term of this patent is extended or adjusted under 35 U.S.C. 154(b) by 259 days.

(21) Appl. No.: 16/021,301

(22) Filed: Jun. 28, 2018

(65) Prior Publication Data

US 2020/0004444 A1    Jan. 2, 2020

(51) Int. Cl.
*G06F 3/00*     (2006.01)
*G06F 3/06*     (2006.01)

(52) U.S. Cl.
CPC .......... *G06F 3/0631* (2013.01); *G06F 3/0604* (2013.01); *G06F 3/0653* (2013.01); *G06F 3/0673* (2013.01)

(58) Field of Classification Search
CPC .... G06F 3/0631; G06F 3/0604; G06F 3/0653; G06F 3/0673
See application file for complete search history.

(56) References Cited

U.S. PATENT DOCUMENTS

| | | | |
|---|---|---|---|
| 8,046,523 B2 | 10/2011 | Hwang et al. | |
| 8,347,004 B2 | 1/2013 | Amit et al. | |
| 9,448,738 B2 | 9/2016 | Horn | |
| 9,740,621 B2 | 8/2017 | Heddes et al. | |
| 2003/0002377 A1* | 1/2003 | Sumitani | G11C 8/12 365/230.03 |
| 2012/0054423 A1* | 3/2012 | Wang | G06F 13/1642 711/105 |
| 2013/0222861 A1* | 8/2013 | Ding | H04N 1/00206 358/474 |
| 2016/0253091 A1* | 9/2016 | Ayyavu | G06F 3/0635 711/103 |

* cited by examiner

*Primary Examiner* — Reginald G Bragdon
*Assistant Examiner* — Michael L Westbrook
(74) *Attorney, Agent, or Firm* — Kowert, Hood, Munyon, Rankin & Goetzel, P.C.

(57) ABSTRACT

An embodiment of an apparatus includes a plurality of processing circuits, a plurality of memory circuits, and a memory controller circuit coupled to each memory circuit via a respective communication channel. A particular processing circuit may generate a data stream that includes a plurality of data blocks. The memory controller circuit may receive the plurality of data blocks from the particular processing circuit. The memory controller circuit may distribute the plurality of data blocks among the plurality of memory circuits based on respective utilizations of the plurality of communication channels.

20 Claims, 9 Drawing Sheets

MEMORY DATA DISTRIBUTION BASED ON COMMUNICATION CHANNEL UTILIZATION

BACKGROUND

Technical Field

Embodiments described herein are related to the field of integrated circuit implementation, and more particularly to the management of memory transactions in a memory system.

Description of the Related Art

In computer system implementations such as a system-on-chip (SoC), memory transaction requests, or simply memory transactions, may be issued from multiple sources, such as, for example, one or more processing cores, a graphics processor, and various other functional circuits. Some functional circuits may have a degree of flexibility concerning when memory transactions are fulfilled and corresponding data is read or stored. For example, a processing core and a graphics processor may have enough performance bandwidth that they can compensate for memory transactions that take a longer that normal time to be fulfilled. In such embodiments, other functional circuits may be more sensitive to delays in fulfilling memory transactions. For example, a camera circuit or a display circuit may need to store or read memory at a particular rate, otherwise frames of video may be lost in a camera circuit if data is not stored on time, or video playback on a display may be disrupted if data is not read in time.

SUMMARY

Broadly speaking, systems and methods are contemplated in which the system includes a plurality of processing circuits, a plurality of memory circuits, and a memory controller circuit coupled to each memory circuit via a respective communication channel. A particular processing circuit may generate a data stream that includes a plurality of data blocks. The memory controller circuit may receive the plurality of data blocks from the particular processing circuit. The memory controller circuit may distribute the plurality of data blocks among the plurality of memory circuits based on respective utilizations of the plurality of communication channels.

In particular implementations, the particular processing circuit may be configured to allocate a common amount of memory space for each data block of the plurality of data blocks regardless of an amount of data included in a given data block. In some embodiments, the common amount of memory space for each data block may be equal to an amount of data stored in an integer number of memory pages. In various embodiments, the memory controller circuit may be further configured to store the plurality of data blocks in the plurality of memory circuits such that a respective data block is transmitted via each channel before a second data block is transmitted via any one of the channels.

In some implementations, a different processing circuit may access data using a memory page buffer. The memory controller circuit may be further configured to, in response to a determination that a storage capacity of the memory page buffer does not align with a capacity of the plurality of communication channels, utilize multiple page access schemes, wherein each page access scheme begins a series of memory accesses with a different one of the plurality of communication channels.

In some embodiments, the memory controller circuit may be configured to send, to the particular processing circuit, an indication of an assigned window of time during which the particular processing circuit is permitted to send one or more of the plurality of portions of data. In further embodiments, the particular processing circuit may be further configured to begin an assigned window of time based on the indication from the memory controller circuit, regardless if the memory controller circuit is idle.

In various embodiments, the particular processing circuit may be further configured to limit an amount of data to transfer based on at least a respective amount of data that can be processed at a destination. In some implementations, the memory controller circuit may be further configured to send a burst factor value to the particular processing circuit in response to a determination that an amount of data being processed by the memory controller circuit is below a threshold, wherein the burst factor value allows the particular processing circuit to increase, for a period of time, the limit on the amount of data to transfer.

BRIEF DESCRIPTION OF THE DRAWINGS

The following detailed description makes reference to the accompanying drawings, which are now briefly described.

Figure 1:
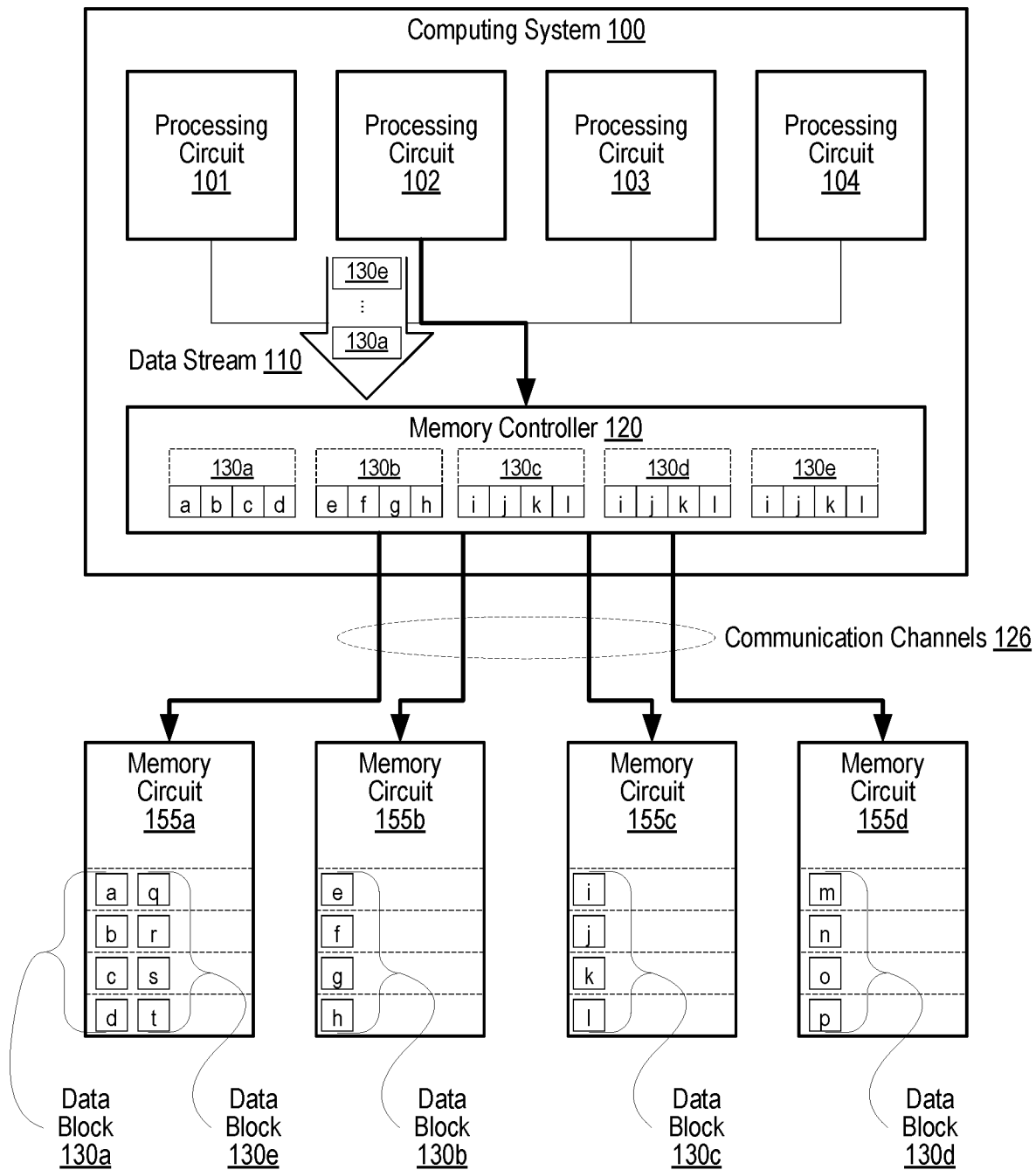
FIG. 1 illustrates a block diagram of an embodiment of a computing system and a memory system.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph (f) interpretation for that unit/circuit/component. More generally, the recitation of any element is expressly intended not to invoke 35 U.S.C. § 112, paragraph (f) interpretation for that element unless the language "means for" or "step for" is specifically recited.

DETAILED DESCRIPTION

Various embodiments of a memory controller circuit are disclosed herein that are used to manage storage and retrieval of data stored in a memory system. Various memory access transactions (also referred to as memory requests) may be assigned one of a set of priorities. One possible example of relatively higher-priority transactions are real-time transactions—that is, transactions that the memory controller is expected to process as received; an example of a lower-priority transaction might be batch or bulk transactions, which are not expected to be processed upon receipt, and may be processed in a group. Embodiments of a memory controller circuit are disclosed herein that attempt to process higher priority transactions with reduced latency relative to other transactions.

In order to manage memory transactions in a reduced amount of time, memory controller circuits disclosed herein may perform actions such as dividing a received data unit (e.g., a data file) into blocks of data for storage in the memory system. Various methods for sizing and storing these data blocks are disclosed herein that may reduce latency for storing and reading data files. In addition, several approaches may be used by processing circuits that issue memory transactions, allowing the memory controller circuit to process the transactions more efficiently. Reducing latency and efficiently processing high priority memory transactions may improve performance of a system, and/or may reduce an amount of time that a user of the system has to wait for feedback from an action performed by the user. For example, reducing a time for video frames to be displayed on a screen may reduce or even eliminate pauses or pixilation during playback and thereby improve a user's perception of performance of the system. As another example, reducing a time to move video frames from a camera circuit to memory may increase a rate at which video frames may be captured, thereby improving a quality of the captured video. Generally speaking, reducing latency in moving data streams into and out of memory may allow for more time to process the data streams or for more data to be streamed, resulting in improved performance.

A block diagram for an embodiment of a computer system and memory system is illustrated in FIG. 1. Computing System 100 and Memory Circuits 155a-155d may be included as circuits on a same integrated circuit, or may be separate circuits coupled together on a circuit board. As shown, Computing System 100 includes four processing circuits, Processor Circuits 101 through 104. These processor circuits are coupled to Memory Controller 120. Memory Controller 120, in turn, provides access to Memory Circuits 155a through 155d (collectively referred to as Memory Circuits 155) via Communication Channels 126.

As depicted, Processing Circuits 101-104 may correspond to any suitable combination of circuits capable of generating a memory transaction. As used herein, a "memory transaction" or simply "transaction" refers to a request to read, write, or modify content (e.g., data or instructions) stored in a memory location corresponding to a particular address. In various embodiments, the address may be provided as a logical address, a physical address, or either. Processing Circuits 101-104 may include any suitable combination of processor cores, graphics processors, network processors, audio processors, camera interface circuits, display circuits, and the like.

Some processing circuits may typically utilize low-priority transactions (e.g., bulk transactions) for memory transactions. For example, high performance processing circuits, such as, e.g., a main application core, or multicore cluster, or a graphics processing unit, may have enough processing bandwidth that delays in sending/receiving data to/from Memory Circuits 155 may be managed and/or compensated for by utilizing the performance bandwidth of such processing circuits to "catch up" once the memory transaction has been processed.

Other processing circuits, however, may be more sensitive to timing delays for sending or receiving data. For example, a camera circuit may have a limited local buffer that is capable of holding one or two frames worth of data. During video capture, such a camera circuit may send a first frame of image data to Memory Circuits 155 while capturing a second frame. To capture a third frame of image data, the camera circuit may utilize the local memory space that had been used to store the first frame. The data comprising the first frame, therefore, should be moved out of the local memory space and into Memory Circuits 155 before data for the third frame is received. Memory transactions for such a camera circuit may, in some embodiments, utilize a high priority memory transaction, such as, e.g., a real-time transaction, to support reduced latencies when storing data to Memory Circuits 155. In some embodiments, display circuits, networking circuits, audio circuits, and similar circuits that stream data either into or out of a local memory buffer may have a similar inclination to use high priority memory transactions to move data into and out of Memory Circuits 155 with reduced latency.

As shown, a processing circuit is configured to generate a data stream that includes a plurality of data blocks. For example, Processing Circuit 102 generates Data Stream 110 as a series of memory transactions to be fulfilled by Memory Controller 120, utilizing Memory Circuits 155. Each memory transaction includes a respective one of Data Block 130a through 130e (collectively referred to as Data Blocks 130) to be sent to Memory Controller 120. In other embodiments, Data Stream 110 may include any number of data blocks.

In order to fulfill a memory transaction, Memory Controller 120 includes circuits configured to receive Data Blocks 130 comprising the data stream from a particular processing circuit such as Processing Circuit 102. Memory Controller 120 distributes the plurality of data blocks among the plurality of memory circuits based on respective utilizations of the plurality of communication channels.

As depicted, Memory Controller 120 is a circuit capable of receiving a data stream from any of Processing Circuits 101-104, and then sending data to Memory Circuits 155 as a plurality of data blocks. Processing Circuits 101-104 may communicate with Memory Controller 120 using any suitable communication network, such as, for example, a basic bus network with a switch to select a source and another switch to select a destination, or a switched fabric network with multiple switches for routing communication between a source and a destination. Memory Controller 120 receives Data Stream 110 as a series of memory transactions, each transaction including a respective one of Data Blocks 130. Memory Controller 120 buffers Data Blocks 130 and generates one or more memory commands for storing each Data Block 130 to Memory Circuits 155.

Memory Controller 120 distributes Data Blocks 130 into Memory Circuits 155 based on respective utilizations of Communication Channels 126. As shown, Memory Controller 120 starts by storing Data Block 130*a* in Memory Circuit 155*a* and then continues by storing each subsequent Data Block 130 to a different one of Memory Circuits 155, via a different one of Communication Channels 126, until each Memory Circuit 155 has received a respective one of Data Blocks 130*a*-130*d*. Memory Controller 120 then reuses Memory Circuit 155*a* to store the next data block, Data Block 130*e*. Such a distribution of the data blocks across the different communication channels may balance a number of memory transactions sent to each memory circuit. Additionally, if the data blocks are read from the memory circuits in a same order, memory transactions to read the data will also be balanced across the different communication channels.

To send a particular data block to a given memory circuit, Memory Controller 120 may generate one or more memory commands, each command sending a part of the particular data block. For example, to send Data Block 130*b* to Memory Circuit 155*b*, Memory Controller 120 generates four memory commands for sending four parts of Data Block 130*b* (parts labeled "e," "f," "g," and "h"). Each part of Data Block 130*b* may correspond to an amount of data to be sent to a particular memory bank in Memory Circuit 155*b*, such as, for example, an amount of data to fill a page of a memory bank. An amount of data in a given data block may correspond to a memory fetch granule. As used and described herein a memory fetch granule (or "MFG") refers to an amount of data that can be accessed via a single memory channel across multiple banks included in a given memory circuit as part of a single memory access transaction. In various embodiments, the amount data included in an MFG may be a function of an architecture of a memory circuit. For example, an MFG may include a number of data bits corresponding to a respective page from each bank included in a memory circuit.

It is noted that a "page" of memory (also referred to herein as a "memory page") corresponds to an amount of data that can be accessed from a single memory bank using a single read or write command. In some embodiments, a memory page may correspond to one or more physical rows of memory cells in a memory array. In other embodiments, a memory page may correspond to a different physical or logical organization of memory cells, such as, for example, one or more columns of memory cells, or a number of memory cells that can be addressed with a portion of a memory address value.

In some cases, one of Processing Circuits 101-104 may access data using a memory page buffer, such as a processor core executing an operating system (OS). A size of the memory page buffer may be defined by the OS, and is referred to herein as an OS memory page buffer. It is noted that a memory page buffer is independent of a page of memory within Memory Circuits 155. In some embodiments, an OS memory page buffer may be based on a page of memory, while in other embodiments, the size of an OS memory page buffer and a size of a memory page may differ.

In some cases, the size of the OS memory page buffer may not "align" with a capacity of the available communication channels, such that all communication channels are not utilized evenly. As used herein, an OS memory page buffer "aligns" with the available communication channels if the size of the buffer is equal to, or a multiple of, the capacity of the available communication channels. Consider a case of alignment, in which the data in the page buffer to be transmitted includes four pages of content, and each of four communication channels can transmit a page. There would also be alignment if the data in the page buffer included eight pages of content and there were four communication channels that could each transmit a page. There would not, however, be alignment (i.e., would be misalignment) for purposes of this disclosure if the page buffer included six pages of content for the same four communication channels, since six is not equal to or a multiple of four. In such a case, the communication channels would not be equally utilized for the transfer. Due to the potential misalignment of the OS memory page buffer and the storage of data in Memory Circuits 155, Memory Controller 120 may utilize multiple OS page access schemes to store data to and read data from Memory Circuits 155. Each page access scheme may begin a series of memory accesses using a different one of the plurality of communication channels. Additional details regarding page access schemes is disclosed below in regards to FIG. 5.

The action of sending a memory transaction to Memory Circuits 155 may, in some embodiments, include issuing a series of memory operations to Memory Circuits 155 along with corresponding address information. Depending on the type of memory transaction, Memory Controller 120 may send data to, or receive data from Memory Circuits 155 for at least some of the memory operations. For simplicity, these actions related to a single memory transaction are referred to herein as "sending the memory transaction" to the memory circuits.

As illustrated in FIG. 1, Data Stream 110 may correspond to a large data file, such as, e.g., a video file. Each memory transaction of Data Stream 110, as depicted, may include one data block of a plurality of data blocks of the data file, with at least some of the data blocks having a common size. The data file, for example, may be divided into a series of data blocks, each data block comprised of a same number of data bytes, except that one block, such as a last portion in the series, may be limited to fewer data bytes if the remaining amount of data is less than the common size. Processing Circuit 102 may then sequentially send the memory transactions to Memory Controller 120. To reduce a latency for completing each of the memory transactions, Processing Circuit 102 sends each of the memory transactions as a real-time transaction.

As part of a process for sending real-time memory transactions, Memory Controller 120 is configured to send, to Processing Circuit 102, an indication of an assigned window of time during which Processing Circuit 102 is permitted to send one or more of the plurality of portions of data. Processing Circuit 102 may then send one or more real-time transactions during the assigned window of time. After a current window of time expires, Processing Circuit 102 waits to begin a subsequent window of time based on the indication sent from Memory Controller 120, regardless if Memory Controller 120 is idle before the indicated beginning of the window. Under some conditions, more than one of Processing Circuits 101-104 may send real-time transactions to Memory Controller 120 during a same time period. As an example, a user of a smartphone may "livestream" audio and video to an Internet address. Within the smartphone, a camera circuit may utilize real-time transactions to send video data for storage in Memory Circuits 155 at a same time as a microphone circuit sends audio data for storage in Memory Circuits 155. A display circuit of the smartphone may retrieve the video data from Memory Circuits 155 to show the user what the camera is capturing. Meanwhile, a network processor may retrieve both the audio and video data from Memory Circuits 155 to send to the Internet address. Some or all of these memory transactions may be prioritized as real-time transactions to reduce latencies for streaming the content from the smartphone to the Internet location.

As depicted, to prevent a single one of Processing Circuits 101-104 from commandeering the bandwidth of Memory Controller 120 and/or Memory Circuits 155, the processing circuits that utilize real-time transactions utilize a procedure that determines a timing window for sending real-time transactions. In some embodiments, a Processing Circuit 101-104 with a real-time transaction to send may request a time slot from Memory Controller 120. Memory Controller 120 may then establish a set of timing windows (also referred to herein as "transaction windows") for all processing circuits that have current requests for a real-time transaction window. For example, if Processing Circuits 101 and 102 are currently assigned timing windows and Processing Circuit 103 makes a new request, then Memory Controller 120 may be configured to divide a current transaction bandwidth between the three processing circuits. In various embodiments, Memory Controller 120 may establish equal size windows to each requesting processing circuit or may adjust a window size to correspond to each processing circuit's capabilities or needs. For example, if a camera circuit can buffer two frames of image data, while a display circuit can buffer three frames of image data, then Memory Controller 120 may establish a larger timing window for the camera circuit so it can move data faster over a given amount of time.

In some embodiments, Memory Controller 120 may assign a transaction window for a requesting processing circuit even if no other processing circuits have currently requested a transaction window. To assign a transaction window, Memory Controller 120 sends to the requesting processing circuit (e.g. Processing Circuit 104), an indication of an assigned window of time during which Processing Circuit 104 is permitted to send one or more memory transactions. Processing Circuit 104 may begin an assigned window of time based on the indication from Memory Controller 120, regardless if Memory Controller 120 is idle. In other words, based on the indication, Processing Circuit 104 begins a given transaction window based on an elapsed amount of time since the beginning of the previous transaction window. If Memory Controller 120 is idle before the beginning of the given transaction window, Processing Circuit 104 waits until the given transaction window begins before sending a memory transaction. Memory Controller 120, therefore, may set a particular pace (e.g., a particular number of memory transactions in a given amount of time) for each Processing Circuit 101-104 that submits real-time transactions. By setting such a pace, Memory Controller 120 may be capable of scheduling memory transactions in an efficient manner that allows the various processing circuits to start and stop submitting series of memory transactions while minimizing disruption to active flows of data into and out of Memory Circuits 155.

In addition, Processing Circuits 101-104 may limit an amount of data to transfer based on at least a respective amount of data that can be processed at a destination of the data. This limit may be determined based on a respective amount of data each processing circuit is capable of processing. For example, a particular display circuit may be able to buffer a single frame of image data. Processing Circuits 101-104 may establish a limit for sending data to such a display circuit to a number of memory transactions that correspond to one frame of image data. Such a limit may help to avoid situations in which a processing circuit submits memory transactions for more data than it can process at a given time. In addition, Processing Circuits 101-104 may establish a limit for sending data based on an amount of data each respective processing circuit is able to generate and buffer. For example, a camera circuit recording video may be capable of buffering two frames of video data, allowing the camera circuit to buffer a first frame and then send the first frame of data to store in memory while buffering the second frame. The camera circuit, therefore, may pace the transmission of the first frame of video data such that the first frame is sent by the time the second frame of data is ready to send, even if the camera circuit and memory are capable of transferring the data in less time. Such a pacing of memory transactions may provide additional bandwidth in the memory controller to service other memory transactions without jeopardizing performance of the camera circuit.

To allow one or more of Processing Circuits 101-104 to submit real-time transactions at an increased rate, Memory Controller 120 is configured to send a burst factor value to a particular one of Processing Circuits 101-104. Memory Controller 120 may enable a burst mode in response to a determination that an amount of data being processed by the memory controller circuit is below a threshold. The burst factor value allows the particular processing circuit to increase, for a period of time, the limit on the amount of data to transfer. To enable a burst mode, Memory Controller 120 determines a burst factor for a particular one of Processing Circuits 101-104. The "burst factor" corresponds to a value for increasing a particular processing circuit's real-time transaction limit. In some embodiments, the burst factor may be limited to an integer value, while in other embodiments, the burst factor may be a real number. During a burst mode, the limit for the number of active memory transactions may be increased for a particular Processing Circuit 101-104 by the determined burst factor. If, for example, Processing Circuit 102 is limited to ten active memory transactions in a non-burst mode operation, then Processing Circuit 102 may be limited to twenty memory transactions in burst mode with a burst factor of two. In some embodiments, the transaction window may be similarly extended based on the burst factor when burst mode is enabled.

Memory Controller 120 may include a plurality of internal circuits, such as, e.g., various interfaces for communicating with Processing Circuits 101-104 and to Memory Circuits 155. In addition, Memory Controller 120 may include or may be coupled to one or more memory cache controllers that manage operation of one or more levels of cache memory. A given data stream from a particular one of Processing Circuits 101-104 may branch to different paths within Computing System 100, such as to Memory Circuits 155 and to a cache memory. When real-time transactions from a particular Processing Circuit 101-104 reach a branch, they may be submitted to each branch using the same limits and transaction windows as described above to maintain a similar pacing. real-time transactions from different Processing Circuits 101-104 may also reach a common arbitration point, such as a cache memory. Arbitration of real-time transactions from different data streams may be performed using a weighted round robin selection technique. In some embodiments, transaction window sizes, active transaction limits, and active burst modes may be used to adjust a weighting factor for the respective data streams.

Returning to the example above, Processing Circuit 102 sends Data Stream 110 to Memory Controller 120 as a series of memory transactions. In order to reduce an amount of data to be transferred to Memory Controller 120, Processing Circuit 102, or an intermediate circuit in other embodiments, performs a compression operation on portions of Data Stream 110. For example, data included in a video stream may be compressed using an MPEG-2 or MPEG-4 format from the Moving Pictures Experts Group (MPEG). Data included in an audio stream may be compressed using the MP3 standard also from MPEG. Voice data to be transmitted via a cellular network may be compressed using an adaptive multi-rate (AMR) compression format. In some embodiments, the compression operation may be data dependent, resulting in the compressed data portions having various sizes, even when the uncompressed data portions have a same size. Under certain conditions, a given compressed data portion may not have any size reduction at all versus the uncompressed source data portion.

Processing Circuit 102, as depicted, is configured to allocate a common amount of memory space for the data portions, regardless of an amount of data included in a given data portion. The common amount of data may be determined based on an amount of data that can be efficiently read from or written to one of Memory Circuits 155 and may, therefore, be based on an architecture of a given type of memory circuit. For example, in some embodiments, the common amount of memory space for each data block is equal to an amount of data stored in an integer number of memory pages. The common amount of data is also referred to herein as a data block.

Processing Circuit 102 stores one or more data portions in each of Data Blocks 130 such that starting addresses of consecutive ones of the received data portions have a common address offset that corresponds to the common size of the plurality of data portions prior to any compression operation. For example, if each uncompressed data portion includes 512 bytes, then a starting address for each uncompressed data portion may be incremented by 512 for each subsequent data portion. Processing Circuit 102 follows a similar addressing scheme for the compressed data portions, such that starting addresses for each compressed data portion are incremented by 512 for each subsequent data portion even if the compressed data portions are smaller than 512 bytes. Processing Circuit 102 then sends a completed one of Data Blocks 130 to Memory Controller 120.

After receiving one of Data Blocks 130, e.g., Data Block 130a, Memory Controller 120 stores Data Block 130a to at least one of the plurality of memory banks in Memory Circuit 155a via one of Communication Channels 126. Each of Communication Channels 126 includes circuitry for communicating to one or more types of memory circuits, as well as a plurality of wires to communicatively couple Memory Controller 120 to each of Memory Circuits 155. Communications Channels 126 may include logic circuits for implementing one or more communication protocols for transmitting memory commands and data to any suitable combination of types of memory devices included in Memory Circuits 155. Memory Circuits 155, as shown, correspond to any suitable type of memory, such as, for example, a Dynamic Random Access Memory (DRAM), a Static Random Access Memory (SRAM), a FLASH memory, a Ferroelectric Random Access Memory (Fe-RAM), Resistive Random Access Memory (RRAM or ReRAM), a Magnetoresistive Random Access Memory (MRAM), and the like. In various embodiments, Memory Circuits 155 may all be of a similar design, or may represent a combination of memory types.

Each of Memory Circuits 155 may include multiple memory banks. In some embodiments, the number of banks may vary between memory circuits. For a given one of Memory Circuits 155, different banks may be capable of fulfilling memory commands at a same time or in an overlapping sequence. Each Memory Circuit 155, however, may be limited to sending or receiving commands, addresses, and data for a single memory command at a time. For example, Memory Controller 120 may send a first command to Memory Circuit 155a to store part "a" of Data Block 130a into an available bank during a first period of time. Once this first command has been sent to Memory Circuit 155a, Memory Controller 120 may send a second command to Memory Circuit 155a to store part "b" of Data Block 130a into a second bank. Memory Circuit 155a may process both commands in parallel, but data related each command may be sent to Memory Circuit 155a at different points in time. Memory Controller 120 may also send commands to different Memory Circuits 155 in parallel. As illustrated, Communication Channels 126 include circuits for communicating with each of Memory Circuits 155 independently, allowing for commands, addresses, and data to be sent and received in parallel.

It is noted, that as used herein, the term "parallel" is used to refer to events that may occur during overlapping points in time. The use of "parallel" is not intended to imply that events begin and end simultaneously, although such occurrences are not ruled out either.

It is also noted that Computing System 100 and Memory Circuits 155, as illustrated in FIG. 1, are merely examples. The illustration of FIG. 1 has been simplified to highlight features relevant to this disclosure. Various embodiments may include different configurations of the circuit blocks, including additional circuit blocks, such as, for example, additional processing circuit blocks. Although four memory circuits are shown, in other embodiments, a different number may be included.

As noted in FIG. 1 above, data included in a data stream may, in some cases, be compressed. One example of a technique for storing data that has been compressed is discussed in FIG. 2.

Figure 2:
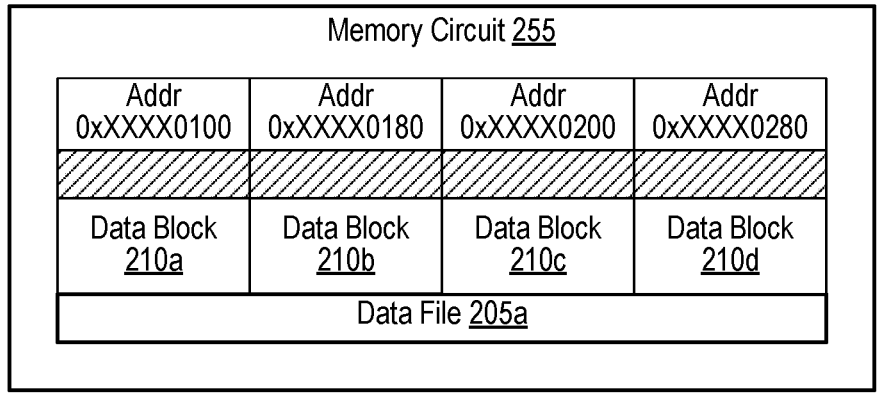
FIG. 2 shows two tables of data representing data blocks of a data file.
Figure 2:
Figure 2:
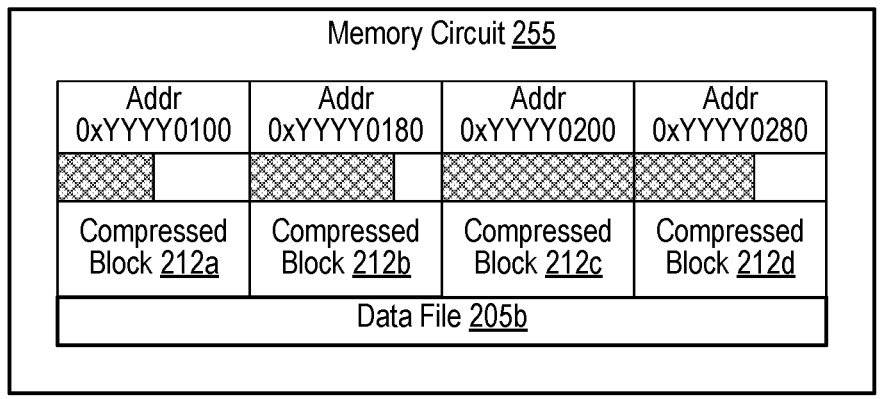

Moving to FIG. 2, a block diagram representing an embodiment of a data file stored in memory with and without compression is shown. As shown, four data blocks (Data Block 210a through Data Block 210d, or collectively Data Blocks 210) of Data File 255a are shown stored in Memory Circuit 255 without compression. Data File 255b represents the same data file stored in Memory Circuit 255 after a compression operation has been run, resulting in Compressed Blocks 212a-212d (collectively referred to as Compressed Blocks 212). Compressed Block 212a corresponds to uncompressed Data Block 210a, and so forth.

As depicted, Data File 205a is divided into four data blocks of a common size (as indicated in FIG. 2 by the diagonal pattern). The common size may be determined based on one or more characteristics of Memory Circuit 255, including a number of memory banks within Memory Circuit 255 that may be written to, or read from in parallel. For example, if Memory Circuit 255 can access four memory banks in parallel, then the common size may correspond to an amount of data that can be accessed from four memory banks. If a memory page of 512 bytes can be accessed by each memory bank, then a common data block size may be 2048 bytes (one 512 byte page in each of the four accessible memory banks). In some embodiments, a write page may be a different size than a read page. For example, a read page may be 512 bytes while a write page may be 256 bytes. In such cases, the common size may be selected for the benefit of read operations or for write operations. It is noted that if a size of Data File 205a is not evenly divisible by the common size, then at least one data block may hold fewer bytes of data than the common size. As illustrated, the common size corresponds to a memory fetch granule.

To conserve memory space and/or to reduce an amount of data to be sent and/or received, a compression operation may be performed on data in a data stream. In some embodiments, some or all of Data Blocks 210 may be compressed, resulting in Compressed Blocks 212. Data File 205b may be referred to as a compressed version of Data File 205a. The cross-hatched area shown in FIG. 2 represents a size of each Compressed Block 212 as compared to the corresponding size of Data Blocks 210. Since a compressed size may be dependent on the values of the data in an uncompressed data block, the sizes of Compressed Blocks 212 are illustrated as varying from the respective sizes of Data Blocks 210. In some cases, a compressed data block may have little to no size reduction compared to the uncompressed source data block, such as shown by Data Block 210c and Compressed Block 212c.

In some implementations, data blocks that have been compressed may be stored in a memory circuit such that there are no gaps between a last address of a first compressed block and a start address of a second compressed block. Such a storage method, however, may result in a memory controller circuit having to spend extra processing time determining starting addresses for subsequent compressed data blocks, or waiting until a final address of a first data block is reached before starting to read a second data block. As shown, Compressed Blocks 212 are stored such that starting addresses of consecutive ones of the Compressed Blocks 212 have a common address offset that corresponds to the common size of Data Blocks 210 prior to the compression operation. A starting address of Data Block 210a is shown as hexadecimal value 0xXXXX0100, where "XXXX" may represent an upper half of a valid address in Memory Circuit 255. Each subsequent one of Data Blocks 210 has a starting address incremented by an offset of 0x80 from the previous data block. After the compression operation has been performed on Data File 205a, resulting in Data File 205b, Compressed Blocks 212 are stored in Memory Circuit 255 using a same offset value of 0x80. As depicted, Compressed Block 212a has a starting address of hexadecimal value 0xYYYY0100, ("YYYY" corresponding to any valid upper address in Memory Circuit 255) with subsequent Compressed Blocks 212 having their respective starting addresses incremented by 0x80. Data Blocks 210 are illustrated as storing data in all memory locations up to the start of the subsequent data block. Compressed Blocks 212, however, are shown to have gaps between the end of a first compressed block and a start of a subsequent compressed block, with the exception of Compressed Block 212c whose size did not compress in the depicted example.

It is noted that by maintaining the same address offset between subsequent compressed blocks as is used for the uncompressed data blocks, address calculations by a memory controller circuit may be performed in a reduced amount of time as compared to other methods in which a subsequent starting address is adjacent to a previous ending address. Furthermore, benefits that may be obtained from storing data blocks across multiple memory banks may be maintained using a same memory organization for both uncompressed and compressed data.

In FIG. 1 above, the memory controller is described as storing data to the memory circuits using a balancing technique to avoid using a particular one of the communication channels more than other ones of the communication channels. An example of this balancing technique is discussed in FIG. 3.

Figure 3:
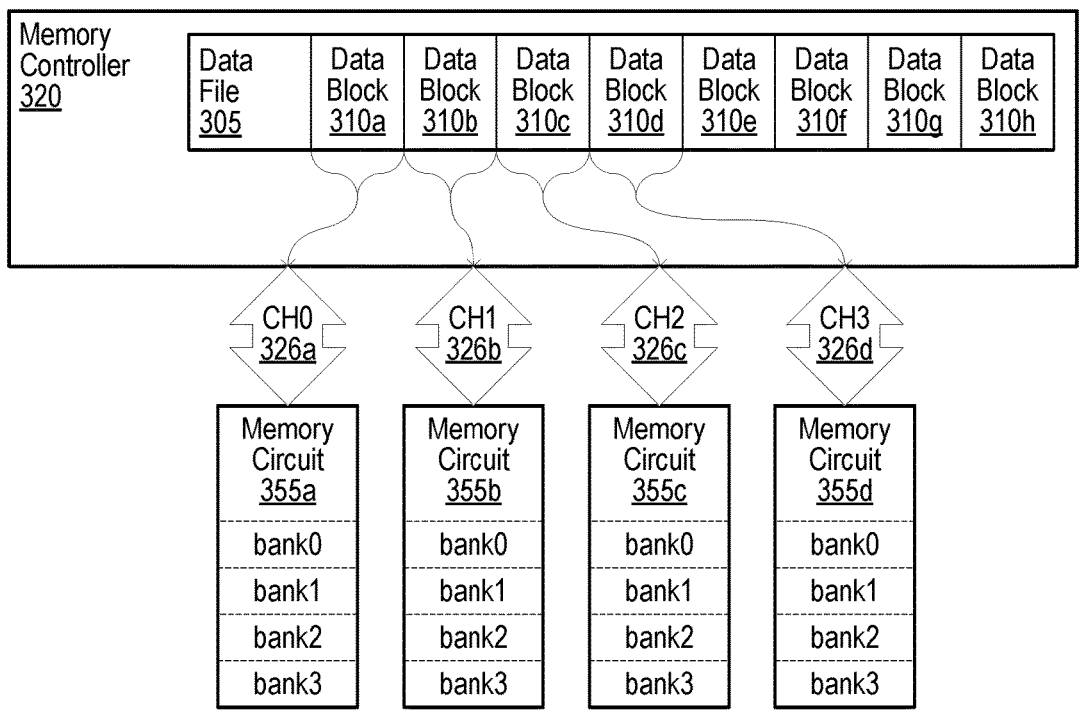
FIG. 3 depicts a block diagram of a memory controller and a memory system at two points in time.
Figure 3:
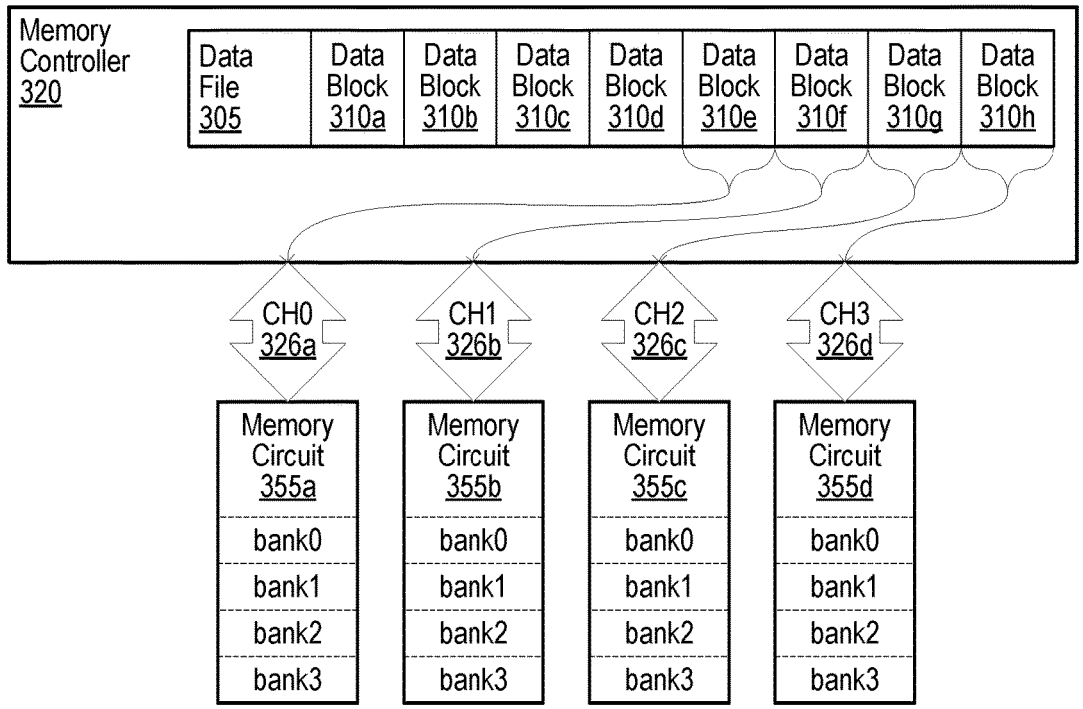

Turning to FIG. 3, an embodiment of a memory controller and a memory system are shown at two points in time. FIG. 3 illustrates Memory Controller 320 and Memory Circuits 355a-355d (collectively Memory Circuits 355) at times t1 and t2, as memory transactions associated with Data File 305 are fulfilled using Memory Circuits 355. Memory Controller 320 issues memory transactions and sends and receives data via Communication Channels 326a-326d, labeled CH0-CH3 in FIG. 3. Communication Channels 326a-326d are each coupled to a respective subset of memory banks included in a corresponding one of Memory Circuits 355. The memory transactions may correspond to, in various embodiments, read operations, write operations, or combinations of the two. As depicted, Memory Controller 320, Memory Circuits 355, and Communication Channels CH0 326a-CH3 326d correspond, respectively, to Memory Controller 120, Memory Circuits 155, and Communication Channels 126 in FIG. 1.

At time t1, Memory Controller 320 issues memory transactions associated with a respective four blocks of Data File 305, Data Blocks 310a-310d. These four transactions are each issued via a different one of CH0 326a-CH3 326d. The four memory transactions may be issued in parallel, in succession, or a combination of the two. Since each of the memory transactions is sent on a different interface channel, Memory Circuits 355 may process the four transactions in parallel, thereby possibly reducing a total amount of time used to complete all the transactions.

At time t2, Memory Controller 320 issues four more memory transactions respectively associated with four more blocks of Data File 305, Data Blocks 310e-310h. Again, as depicted in FIG. 3, each of the four memory transactions are sent via a respective one of CH0 326a-CH3 326d. Each memory transaction may be sent from Memory Controller 320 to Memory Circuits 355 after the previous memory transaction sent via the respective one of CH0 326a-CH3 326d has completed. Using such a procedure, Memory Controller 320 may issue memory transactions to, for example, store Data Blocks 310a-310h into the memory banks of Memory Circuits 355 such that a respective data block is transmitted via each of CH0 326a-CH3 326d before a second data block is transmitted via any one of the channels.

In certain circumstances, some memory devices included in a memory system may be sent more transactions that other memory devices in the memory system. When such a situation occurs (commonly referred to as "hot spotting"), one or more memory devices may become overloaded by fulfilling memory transactions, while other memory devices are idle or under loaded, thereby introducing inefficiencies in the memory system. Distributing memory transactions across various channels of the memory interface may balance a series of memory transactions across all of the memory devices in the memory system, thereby reducing occurrences of "hot spotting."

It is noted that the embodiment of FIG. 3 is merely an example for demonstrating the disclosed concepts. In other embodiments, a different number of memory circuits and corresponding Communication Channels may be included in the memory system. Although the data file is shown with eight data blocks, any suitable number of data blocks may be included in other data files. An example of how a data file with more than eight data blocks may be stored in the memory circuits is described in FIG. 4.

Figure 4:
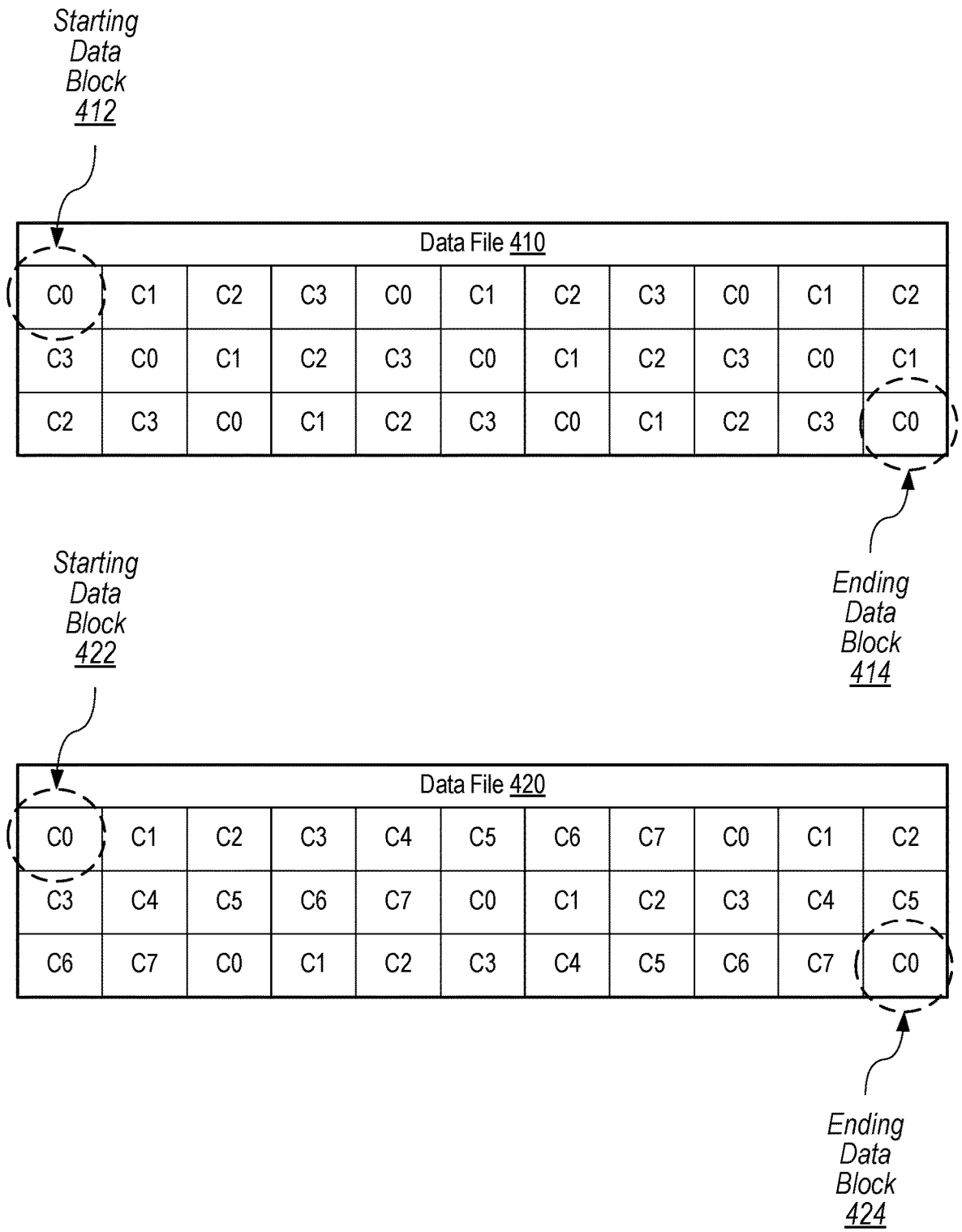
FIG. 4 presents two tables representing a mapping of data blocks of a data file to memory channels of a memory interface.

Proceeding to FIG. 4, two tables representing embodiments of data files are depicted. Each of Data Files 410 and 420 are shown divided into three rows and eleven columns of data blocks, or MFGs. A channel indication is included in each data block to indicate which of a number of Communication Channels each block will be accessed through when writing or reading the data block to a memory system, such as Memory Circuits 155 or 355 in FIGS. 1 and 3, respectively. Data Files 410 and 420 may demonstrate how a memory controller can organize data within a data file to be used in combination with a memory storage procedure such as shown in FIG. 3.

As shown, Data Files 410 and 420 correspond to a frame, or portion of a frame, of an image, although, in other embodiments, they may correspond to other types of data. The images represented by Data Files 410 and 420 may be received from a camera circuit, or may be sent to a display circuit, or both. Data File 410 is included in a system that has four Communication Channels from a memory controller to a memory system, such as illustrated in FIG. 3, while Data File 420 is included in a system that has eight Communication Channels. Each data block of each data file includes data for a plurality of pixels. When Data File 410 is read from memory to be displayed, the data blocks may be read in order from Starting Data Block 412 to Ending Data Block 414. Under various conditions, the data blocks may be read in rows or in columns. For example, on a smartphone or tablet computer, Data Files 410 and 420 may be read in row or columns based on an orientation of the display screen. As presented, to support the memory access method disclosed above, the data blocks comprising Data Files 410 and 420 are organized such that a different memory interface channel is used for each subsequently accessed data block until all channels have been used one before repeating use of a given channel.

Referring to Data File 410 in the four-channel system, if the data blocks are accessed by the illustrated rows, then beginning with Starting Data Block 412 and moving to the right, channels C0 through C3 are accessed for the first four data blocks, and the channel order repeats until the last data block of the first row is accessed using channel C2. The first data block of the second row may be accessed with channel C3 in parallel with the last three data blocks of the first row. This process may repeat until Ending Data Block 414 is read using channel C0. If the display is rotated 90 degrees, e.g., from a landscape to a portrait orientation, then Data File 410 may be accessed in a different order, such as by the illustrated columns, beginning again with Starting Data Block 412. In this case, the data blocks of the first column may be read by accessing, in order, channels C0, C3, and C2, and then reading the top block of the second column using channel C1. After the first four data blocks have been accessed, then a next four may be accessed using the same order of channels: C0, C3, C2, and C1. This pattern may repeat until Ending Data Block 414 is read using channel C0. Although the channels may not be read in numerical order, each of the four channels may be accessed in parallel to improve a speed for completing the memory operation on Data File 410.

Memory operations for Data File 420, in the eight-channel system, may be performed in a similar manner. If the data blocks are accessed by rows beginning with Starting Data Block 422, then the Communication Channels may be utilized in order from channel C0 to channel C7. If the display is rotated and the data blocks are accessed by columns, then the Communication Channels may be accessed using a pattern of C0, C3, C6, C1, C4, C7, C2, and C5. Again, this pattern repeats until Ending Data Block 424 is accessed using channel C0. By having processing circuits such as camera circuits and display circuits organize and access data using such patterns, memory transactions may be balanced across available Communication Channels, thereby potentially reducing hot spotting and increasing an efficiency of the memory system.

It is noted that the embodiment of FIG. 4 is an example for demonstrating disclosed concepts. In other embodiments, data files may be organized into a different number of rows and or columns, suitable for the number of memory channels included in a corresponding system.

Figure 5:
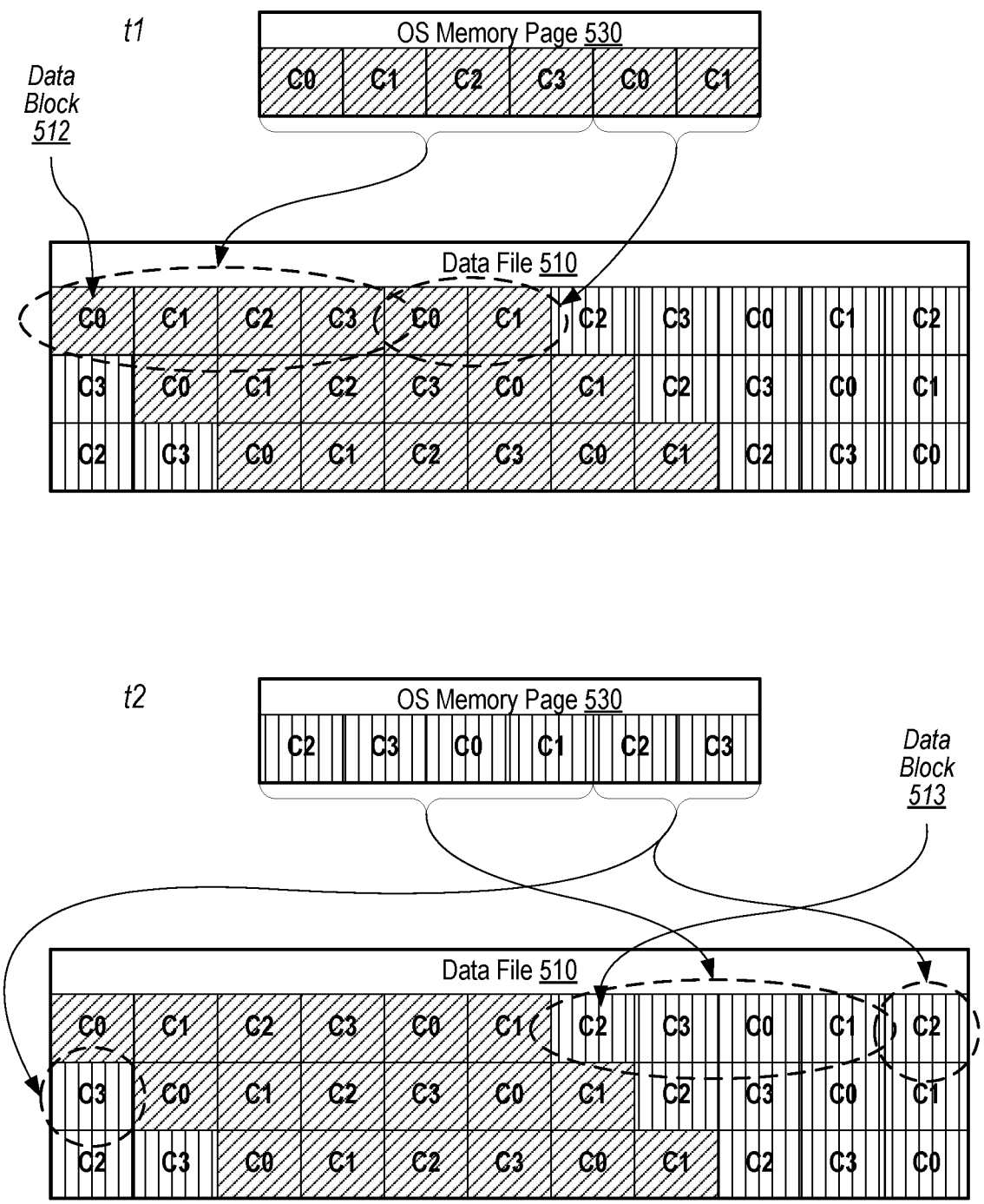
FIG. 5 illustrates two tables at two points in time, the two tables representing a mapping of data blocks of a data file to an operating system memory page.

An operating system is described in FIG. 1 above, in which the operating system utilizes a memory page buffer for processing data. This memory page buffer, also referred to herein as an OS memory page, may be utilized when the operating system is reading, writing, or otherwise manipulating data for one or more system processes. FIG. 5 depicts an example of how data may be mapped between a memory page buffer and data stored in a memory circuit, such as Data Files 410 and 420.

Moving now to FIG. 5, one table representing an embodiment of a data file and another table representing an embodiment of an operating system page are depicted at two different points in time. As depicted, Data File 510 represents a data file included in a system that has four Communication Channels, similar to Data File 410 shown in FIG. 4. OS Memory Page 530 represents a memory page buffer that may be used by an operating system (OS) executing on a computer system, such as Computing System 100 in FIG. 1, when reading/writing data from/to a memory system, such as Memory Circuits 155 in FIG. 1.

OS Memory Page 530, as depicted, is used when a processing circuit such as a CPU core is executing an OS and the OS is buffering a particular amount of data. A size of OS Memory Page 530 may be determined by a particular OS executing on Computing System 100. Since a given OS may be executed by a variety of hardware systems, the size of OS Memory Page 530 may not align most efficiently with the number of Communication Channels 126 and the size of a data block such as Data Block 512 or 513. As described above, alignment occurs when the size of OS Memory Buffer 530 is equal to or a multiple of an amount of data that can be accessed across all communication channels. In the case where, for a given communication channel, an amount of data that may be accessed concurrently is a data block, then alignment occurs when the size of the OS Memory Buffer 530 is a multiple of the number of Communication Channels 126 (four, as shown) multiplied by the size of a data block. As noted above, if OS Memory Page Buffer 530 were the size four or eight data blocks, then the size of OS Memory Page Buffer 530 would be aligned with the with four Communication Channels 126 of FIG. 1. If, on the other hand, the size of Buffer 530 were some other number, Buffer 530 would be considered to misalign with the number of Communication Channels.

As depicted, however, OS Memory Page 530 is capable of storing six data blocks of Data File 510 at one time. Memory Controller 120 may make a determination how many data blocks can be stored within OS Memory Page 530. In various embodiments, OS Memory Page 530 may be able to store exactly six data blocks or may have unused memory locations leftover when storing this much data.

As described above, Memory Circuits 155 may operate with an increased efficiency when data blocks are accessed such that each memory interface channel is used once before using any one channel a second time, thereby reducing occurrences of hot spots in which one subset of the channels are utilized more frequently than a second subset of channels. Memory Controller 120, therefore, may utilize a procedure to balance usage of the Communication Channels when accessing Data File 510 for the OS. For example, if Memory Controller 120 is storing data from OS Memory Page 530 into Data File 510 in Memory Circuits 155, then Memory Controller 120, as shown, utilizes two different OS page access schemes for transferring data from OS Memory Buffer 530 to Data File 510 in Memory Circuits 155. As referred to herein, an "OS page access scheme" refers to an order in which the communication channels are accessed to read or write data from/to the memory circuit to/from an OS memory page buffer.

At time t1, a first page mapping is shown. Beginning with Data Block 512, data in OS Memory Page 530 is mapped to Communication Channels C0, C1, C2, and C3. The remaining data is mapped into channels C0 and C1. Memory Controller 120 copies the first four data blocks using channels C0 through C3 in a first memory transaction, and then copies the remaining data in a second memory transaction, reusing channels C0 and C1.

At time t2, a second page of data is ready to be copied from OS Memory Page 530 to Data File 510. If Memory Controller 120 uses a same mapping as used at time t1, i.e., starting with channel C0, then Communication Channels C0 and C1 will again be used twice, while channels C2 and C3 are used once. Such hot spotting on channels C0 and C1 may reduce efficiency by overusing these channels while leaving channels C2 and C3 idle. If Memory Controller 120 is fulfilling other memory transactions in parallel with writing data to Data File 510, any of these other memory transactions that also utilize channels C0 and C1 may be delayed while waiting on Data File 510 transactions to be fulfilled, and/or transactions for writing Data File 510 may be delayed waiting on these other memory transactions.

To avoid such hot spotting of channels C0 and C1, Memory Controller 120 utilizes a different access scheme from OS Memory Page 530 to the Communication Channels 126 to write the second page of data to Data File 510. As shown, Memory Controller 120 starts with memory interface channel C2 mapped to Data Block 513, followed in order by channels C3, C0, and C1. A memory transaction is generated to write the four data blocks to Data File 510. Memory Controller 120 then reuses channels C2 and C3 to copy the remaining data from OS Memory Page 530.

As additional data is ready to copy from OS Memory Page 530, Memory Controller 120 alternates between the first OS page access scheme (indicated by the diagonal cross hatching) and the second OS page access scheme (indicated by the vertical cross hatching). By alternating between these two OS page access schemes, hot spots on the Communication Channels 126 may be reduced or even avoided. Again, balancing an amount of data transferred across each of Communication Channels 126 may increase an efficiency of Memory Circuits 155 and, in turn, increase performance of Computing System 100.

In other embodiments, the size of a given OS memory page buffer may differ as well as a size of a given data block and a number of channels in the memory interface. The memory controller may, therefore, determine that the number of memory channels times a common size of a data block does not correspond to a size of the memory page buffer. To reduce occurrences of hot spotting, the memory controller may utilize multiple OS page access schemes, wherein each OS page access scheme begins a series of memory accesses using a different one of the plurality of channels.

It is noted that the tables of FIG. 5 are one example. In other embodiments, other suitable channel assignments for data blocks in a data file may be used. Various embodiments may utilize other suitable sizes for an OS memory page. Although four Communication Channels are illustrated, other embodiments may include a different number of interface channels.

Figure 6:
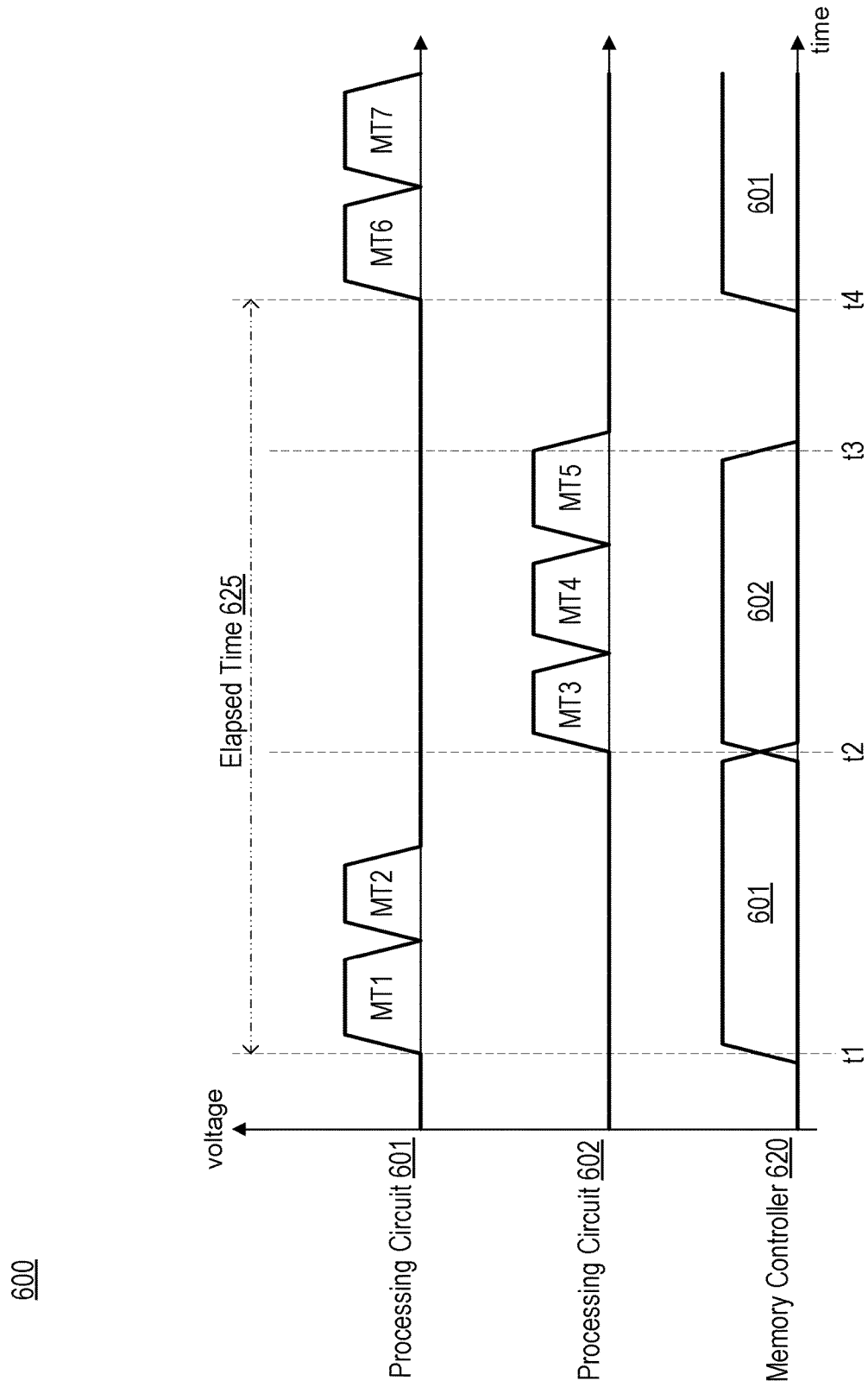
FIG. 6 shows a timing diagram representing processing of memory transactions in an embodiment of a computer system.

The processing circuits are described above as utilizing windows of time for sending memory transactions. FIG. 6 below presents an example of how the windows of time may operate.

Turning now to FIG. 6, a timing diagram is depicted with three waveforms associated with operation of a memory controller and various processing circuits in a computer system. Timing Diagram 600, as shown, represents activity associated with Computing System 100 in FIG. 1. Waveforms corresponding to Processing Circuits 601 and 602 indicate when memory transactions are processed by each of the respective processing circuits. As depicted, Processing Circuits 601 and 602 may correspond to any two of Processing Circuits 101-104 in FIG. 1. When the corresponding waveform is asserted high, the respective Processing Circuits 601 or 602 sends a memory transaction to Memory Controller 620 for processing. Memory Controller 620, as shown, corresponds to Memory Controller 120. The waveform corresponding to Memory Controller 620 indicates a window of time in which a particular one of Processing Circuits 601 and 602 is allowed to send memory transactions to Memory Controller 620.

As previously stated, each of Processing Circuits 601 and 602 may send one or more memory transactions of a series of memory transactions to Memory Controller 620 during an assigned window of time. As shown in FIG. 6, at time t1, a window for Processing Circuit 601 begins. As indicated, Processing Circuit 601 sends two successive memory transactions, MT1 and MT2, to Memory Controller 620. In some embodiments, Processing Circuit 601 may not have further transactions to send in the remaining time in the window after MT2 has been sent. In other embodiments, Processing Circuit 601 may limit a number of memory transactions issued in a given window or number of windows. In some embodiments, this limit may be based on a respective amount of data that Processing Circuit 601 can process at a given time, an amount of data that Processing Circuit 601 can buffer at a given time, or a combination thereof. In other embodiments, the limit may be based on an amount of data that a processing circuit at a destination receiving data from Processing Circuit 601 can buffer and/or process.

At time t2, the window for Processing Circuit 601 closes and a window for Processing Circuit 602 begins. In response to the open window, Processing Circuit 602 sends three memory transactions, MT3, MT4, and MT5. The window for Processing Circuit 602 ends at time t3 before Processing Circuit 602 can send another memory transaction.

Between times t3 and t4, neither Processing Circuit 601 nor Processing Circuit 602, sends any memory transactions. In some embodiments, Processing Circuits 601 and 602 may be the only circuits with memory transactions to send to Memory Controller 620. Memory Controller 620, however, includes a window in which neither processing circuit sends additional memory transactions. This time from t3 to t4 may be used to pace (e.g., establish a particular number of transactions per unit time) the submission of memory transactions such that Processing Circuits 601 and 602 do not consume all the transaction processing bandwidth of Memory Controller 620, leaving some bandwidth available for other processing circuits that may send a memory transaction after a period of being idle. The time period from t3 to t4 may also be used to avoid Processing Circuits 601 and 602 from sending memory transactions corresponding to more data than they are capable of processing in a particular amount of time.

In some embodiments, the windows for Processing Circuits 601 and 602 may be established for these circuits to send high priority real-time memory transactions. The time period from times t3 to t4 may allow Memory Controller 620 to process non-real-time memory transactions.

As shown, Processing Circuit 601 begins a next window at time t4, in response to a determination that a particular amount of time has elapsed since a start of a previous window, as indicated by Elapsed Time 625. The subsequent window for Processing Circuit 601 may wait until time t4 regardless if Memory Controller 620 is idle.

It is noted that the timing diagram of FIG. 6 is one example. The illustrated waveforms are not intended to represent specific signals within a particular computer system, but instead to merely demonstrate relative timing of various activity occurring in such a computer system. In other embodiments, additional processing circuits may be active, and more or fewer memory transactions may be allowed during a particular window of time.

Figure 7:
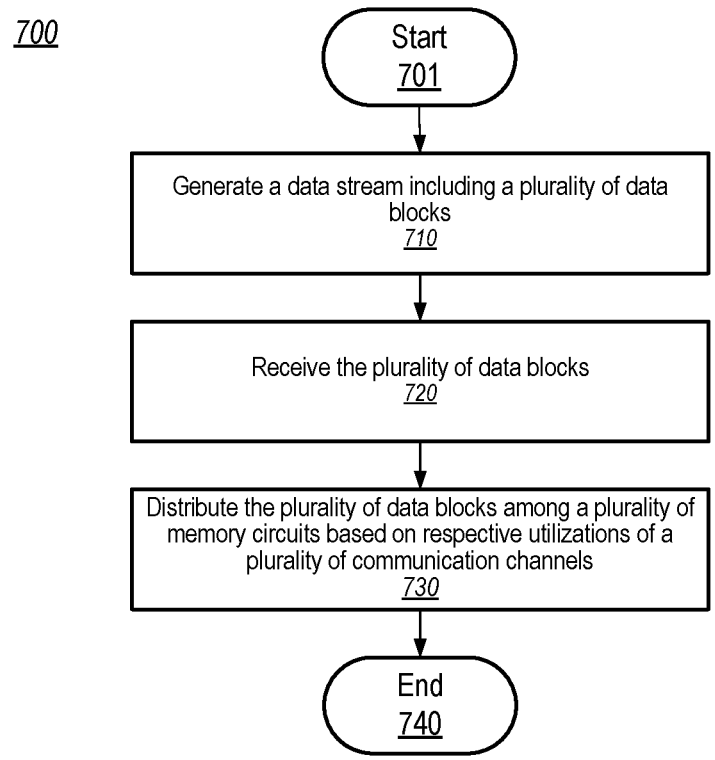
FIG. 7 presents a flow diagram of an embodiment of a method for processing memory transactions by a computer system.

Proceeding now to FIG. 7, a flow diagram illustrating an embodiment of a method for processing a memory transaction in a cache controller is shown. Method 700 may be applied to a computer system, such as, for example, Computing System 100 in FIG. 1. Referring collectively to FIG. 1 and the flow diagram of FIG. 7, the method may begin in block 701.

A processing circuit generates a data stream including a plurality of data blocks (block 710). As depicted, one of Processing Circuits 101-104, for example, Processing Circuits 101, generates a series of memory transactions, each memory transaction including a data block from a corresponding data file. This series of memory transactions may be related to a single data file or to multiple data files, and may include any combination of read and write operations. For example, Processing Circuit 101 may generate multiple memory transactions for writing a first data file to Memory Circuits 155. At least some of the data blocks have a common size that is based on one or more characteristics of a plurality of memory banks. For example, all data blocks related to a same data file may have a common size except for a final data block. The common size may be applied to data blocks in all data files stored in Memory Circuits 155.

The memory controller circuit receives the plurality of data blocks (block 720). Processing Circuit 101 sends the plurality of data blocks as a series of memory transactions to Memory Controller 120. The data blocks may conform to a common amount of data particular to a type of memory transaction, such as, for example, a real-time transaction. Memory Controller 120 generates one or more memory commands to correspond to each received memory transaction. For example, each memory command may include a page of data for a particular memory bank in a particular one of Memory Circuits 155.

The memory controller circuit distributes the plurality of data blocks among a plurality of memory circuits based on respective utilizations of a plurality of communication channels (block 730). As depicted, the received data blocks are stored using a technique that distributes memory commands across Memory Circuits 155 to avoid or minimize hot spotting. For example, the received data blocks may be stored such that one data block is stored into each of Memory Circuits 155 before any one of Memory Circuits 155 receives a second data block. Method 700 ends in block 740.

It is noted that the method illustrated in FIG. 7 is an example for demonstrating the disclosed concepts. Although one processing circuit is described as generating memory transactions in the illustrated example, in other embodiments, any suitable number of processing circuits may be generating memory transactions at a given time. In some embodiments, operations may be performed in a different sequence.

Figure 8:
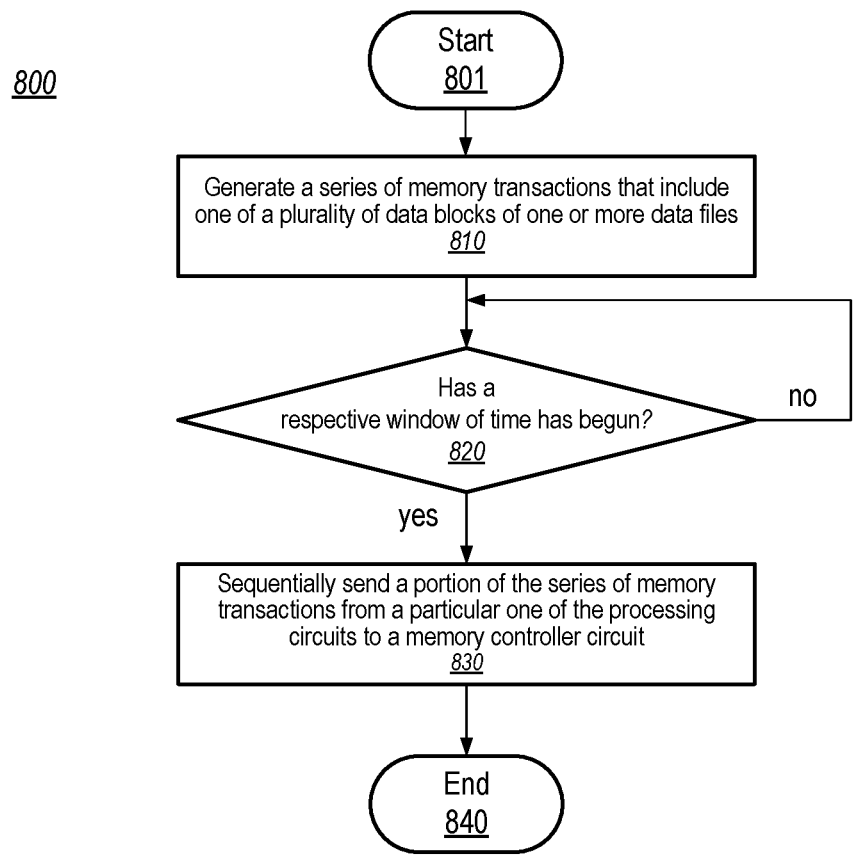
FIG. 8 depicts a flow diagram of another embodiment of a method for processing memory transactions by a computer system.

Moving to FIG. 8, a flow diagram illustrating an embodiment of a method for processing a memory transaction in a cache controller is shown. Similar to Method 700 above, Method 800 may be applied to a computer system, such as, for example, Computing System 100 in FIG. 1. In some embodiments, Methods 700 and 800 may performed in parallel on Computing System 100. Referring collectively to FIG. 1 and the flow diagram of FIG. 8, the method may begin in block 801.

A plurality of processing circuits generates a series of memory transactions that include one of a plurality of data blocks of one or more data files (block 810). At least some of the data blocks have a common size. As depicted, two or more of Processing Circuits 101-104, for example, Processing Circuits 102 and 103, generate a series of memory transactions, each memory transaction including a data block from a corresponding data file. The series of memory transactions may be related to a single data file or to multiple data files and may include any combination of read and write operations. For example, Processing Circuit 102 may generate multiple memory transactions for writing a first data file to Memory Circuits 155, while Processing Circuit 103 generates multiple memory transactions for reading a second data file from Memory Circuits 155.

Further operations of the method may depend on a start of a particular window of time (block 820). As depicted, Memory Controller 120 assigns respective windows of time to processing circuits that have generated memory transactions to send to Memory Controller 120. In the current example, Processing Circuits 102 and 103 have generated memory transactions to send, and Memory Controller 120 assigns a particular window of time to each of Processing Circuits 102 and 103. The respective windows do not overlap, and in various embodiments, may be continuous, e.g., one window begins as another ends, or may include periods of time between some or all consecutive windows. When a window of time for one of Processing Circuits 102 or 103 begins, the method moves to block 830 to send a portion of the series of memory transactions. Otherwise, if a window has not begun, then the method remains in block 820.

A particular processing circuit of the plurality of processing circuits sends a portion of the series of memory transactions to the memory controller circuit (block 830). The particular processing circuit, Processing Circuit 102 or 103, sends one or more memory transactions to Memory Controller 120. The number of memory transactions sent may be determined by a duration of the window of time and may be further determined by a limit imposed by Memory Controller 120. In various embodiments, Memory Controller 120 may limit a number of memory transactions a given processing core may send within one window, and/or may limit a total number of memory transactions the particular processing circuit has send but are still actively being fulfilled. The limits may be the same for each processing circuit or may be different based on a processing capability of the particular processing circuit.

Take, for example, a case in which Processing Circuit 102 is a camera circuit capable of recording video at 120 frames per second, and Processing Circuit 103 is a display circuit capable of displaying video at 120 frames per second. If the video frames for the camera circuit and the display circuit are the same size, then Memory Controller 120 may set similar limits for both Processing Circuits 102 and 103. However, if the camera records in 4K resolution (8,294,400 pixels per frame) while the display supports 1080p resolution (2,073,600 pixels per image), then Memory Controller 120 may impose a smaller limit on Processing Circuit 103 than on Processing Circuit 102 since Processing Circuit 102 has four times as much data to process than Processing Circuit 103. Memory Controller 120 may, therefore, limit a number of memory transactions Processing Circuit 103 can send within a given window, and/or may limit a total number of unfulfilled memory transactions Processing Circuit 103 may have outstanding at a given time. In some embodiments, Memory Controller may set the limit based on an integer multiple of the amount of data Processing Circuit 103 may process, such as two or three times the size of one video frame. After the particular processing circuit sends the portion of the series of memory transactions, the method ends in block 840.

It is noted that Method 800 is merely one example included for demonstrative purpose. In other embodiments, operations may be performed in a different sequence. Additional operations may also be included.

Some or all of the system depicted in FIG. 1 above may be implemented as an integrated circuit. For example, Computing System 100 may be one computer chip within a personal computer, smart phone, tablet computer, or other type of computing device. A process for designing and producing an integrated circuit using design information is presented below in FIG. 9.

Figure 9:
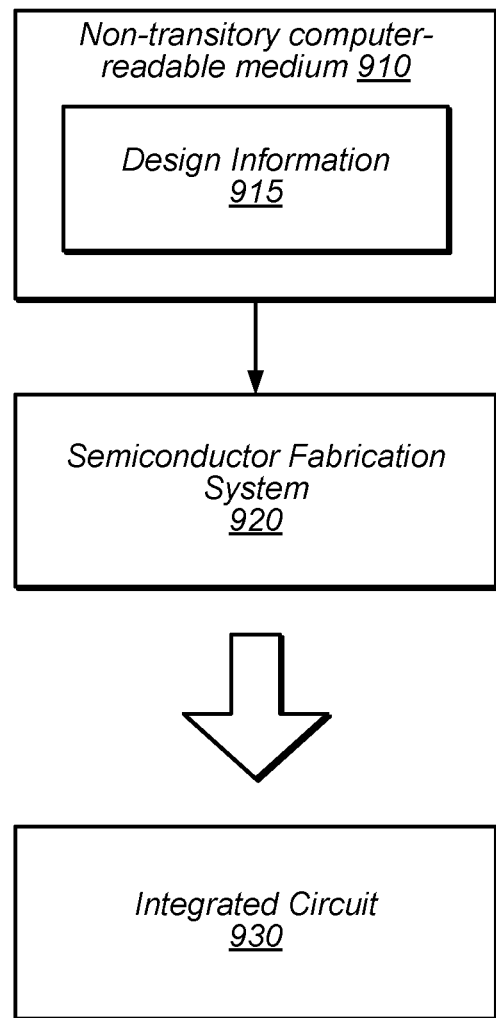
FIG. 9 illustrates a block diagram depicting an example computer-readable medium, according to some embodiments.

FIG. 9 is a block diagram illustrating an example of a non-transitory computer-readable storage medium that stores circuit design information, according to some embodiments. The embodiment of FIG. 9 may be utilized in a process to design and manufacture integrated circuits, such as, for example, an IC that includes Computing System 100 and/or Memory Circuits 155 of FIG. 1. As depicted, Semiconductor Fabrication System 920 is configured to process the Design Information 915 stored on Non-Transitory Computer-Readable Storage Medium 910 and fabricate Integrated Circuit 930 based on the Design Information 915.

Non-Transitory Computer-Readable Storage Medium 910, may comprise any of various appropriate types of memory circuits or storage devices. Non-Transitory Computer-Readable Storage Medium 910 may be an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-Transitory Computer-Readable Storage Medium 910 may include other types of non-transitory memory as well or combinations thereof. Non-Transitory Computer-Readable Storage Medium 910 may include two or more memory mediums which may reside in different locations, e.g., in different computer systems that are connected over a network.

Design Information 915 may be specified using any of various appropriate computer languages, including hardware description languages such as, without limitation: VHDL, Verilog, SystemC, SystemVerilog, RHDL, M, MyHDL, etc. Design Information 915 may be usable by Semiconductor Fabrication System 920 to fabricate at least a portion of Integrated Circuit 930. The format of Design Information 915 may be recognized by at least one semiconductor fabrication system, such as Semiconductor Fabrication System 920, for example. In some embodiments, Design Information 915 may include a netlist that specifies elements of a cell library, as well as their connectivity. One or more cell libraries used during logic synthesis of circuits included in Integrated Circuit 930 may also be included in Design Information 915. Such cell libraries may include information indicative of device or transistor level netlists, mask design data, characterization data, and the like, of cells included in the cell library.

Integrated Circuit 930 may, in various embodiments, include one or more custom macrocells, such as memories, analog or mixed-signal circuits, and the like. In such cases, Design Information 915 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor Fabrication System 920 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor Fabrication System 920 may also be configured to perform various testing of fabricated circuits for correct operation.

In various embodiments, Integrated Circuit 930 is configured to operate according to a circuit design specified by Design Information 915, which may include performing any of the functionality described herein. For example, Integrated Circuit 930 may include any of various elements shown or described herein. Further, Integrated Circuit 930 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A system, comprising:
    a plurality of processing circuits including a particular processing circuit configured to generate, using a memory page buffer, wherein a given page of the memory page buffer includes a particular number of data blocks, a data stream that includes a plurality of pages;
    a plurality of memory circuits; and
    a memory controller circuit coupled to each memory circuit of the plurality of memory circuits via a respective one of a plurality of communication channels, wherein the memory controller circuit is configured to:
        receive a first page of the plurality of pages from the particular processing circuit, wherein the first page includes the particular number of data blocks;
        determine that a storage capacity of the memory page buffer does not align with a capacity of the plurality of communication channels;
        distribute the first page of data blocks among the plurality of memory circuits using a first series of memory accesses, initiating a first one of the first series via a particular one of the plurality of communication channels;
        receive a second page of the plurality of pages from the particular processing circuit, wherein the second page includes one or more data blocks; and
        distribute the one or more data blocks among the plurality of memory circuits using a second series of memory accesses, initiating a first one of the second series of memory accesses via a different one of the plurality of communication channels.

2. The system of claim 1, wherein the particular processing circuit is further configured to allocate a common amount of memory space for a plurality of the data blocks in the data stream regardless of an amount of data included in each data block.

3. The system of claim 2, wherein the common amount of memory space for the plurality of the data blocks is equal to an amount of data that may be accessed in a single memory access transaction via one of the plurality of communication channels.

4. The system of claim 2, wherein the memory controller circuit is further configured to store the data blocks of the first and second pages into the plurality of memory circuits such that a respective data block is transmitted via each communication channel before a second data block is transmitted via any one of the communication channels.

5. The system of claim 4, wherein to distribute the data blocks of the first and second pages among the plurality of memory circuits using the first and second series of memory accesses, the memory controller circuit is further configured to utilize first and second page access schemes, wherein the first page access scheme begins a given series of memory accesses with the particular communication channel and the second page access scheme begins a given series of memory accesses with the different communication channel.

6. The system of claim 1, wherein the memory controller circuit is configured to send, to the particular processing circuit, an indication of an assigned window of time during which the particular processing circuit is permitted to send the first page of the plurality of pages.

7. The system of claim 6, wherein the particular processing circuit is further configured to begin the assigned window of time based on the indication from the memory controller circuit, regardless if the memory controller circuit is idle.

8. The system of claim 1, wherein the particular processing circuit is further configured to limit an amount of data to transfer based on at least a respective amount of data that can be processed at a destination.

9. The system of claim 8, wherein the memory controller circuit is further configured to send a burst factor value to the particular processing circuit in response to a determination that an amount of data being processed by the memory controller circuit is below a threshold, wherein the burst factor value allows the particular processing circuit to increase, for a period of time, the limit on the amount of data to transfer.

10. A method, comprising:
    generating, by a processing circuit using a memory page buffer capable of holding a first number of data blocks, a data stream including a plurality of pages of data blocks;
    receiving, by a memory controller circuit, a first page of data blocks of the plurality of pages of data blocks;
    determining, by the memory controller circuit, that the first number of data blocks does not align with a second number of communication channels to respective memory circuits;
    distributing, by the memory controller circuit, the first page of data blocks among the second number of communication channels using a first series of memory accesses, initiating a first one of the first series of memory accesses via a particular one of the communication channels;
    receiving, by the memory controller circuit, a second page of data blocks of the plurality of pages of data blocks; and
    distributing, by the memory controller circuit, the second page of data blocks among the second number of communication channels using a second series of memory accesses, initiating a first one of the second series of memory accesses via a different one of the communication channels.

11. The method of claim 10, further comprising allocating, by the processing circuit, a common amount of memory space for a plurality of the data blocks in the data stream regardless of an amount of data compression achieved in a given data block.

12. The method of claim 10, further comprising distributing, by the memory controller circuit, the data blocks of the first and second pages across the second number of communication channels to balance a number of memory transactions sent via each of the second number of communication channels.

13. The method of claim 12, wherein distributing the data blocks of the first and second pages among the second number of communication channels includes utilizing, by the processing circuit, multiple page access schemes, wherein each page access scheme initiates a first one of the first and second series of memory accesses via a different one of the second number of communication channels.

14. The method of claim 10, further comprising sending, by the memory controller circuit to the processing circuit, an indication of an assigned window of time during which the processing circuit is permitted to send one or more of the first page of data blocks.

15. The method of claim 14, further comprising sending, by the memory controller circuit to a different processing circuit, an indication of a different window of time during which the different processing circuit is permitted to send one or more respective data blocks, wherein the assigned window of time and the different window of time do not overlap.

16. The method of claim 10, further comprising limiting, by the processing circuit, a number of data blocks sent to the memory controller circuit based on an amount of data that the processing circuit can generate and an amount of data the processing circuit can buffer.

17. The method of claim 16, further comprising increasing, for a period of time by the processing circuit, the limit on the number of data blocks to transfer based on a burst factor that is provided by the memory controller circuit.

18. A non-transitory computer-readable storage medium having stored thereon design information that specifies a design of at least a portion of a hardware integrated circuit in a format recognized by a semiconductor fabrication system that is configured to use the design information to produce the hardware integrated circuit according to the design, wherein the design information specifies that the hardware integrated circuit comprises:

a plurality of processing circuits including a particular processing circuit configured to generate, using a memory page buffer, wherein a given page of the memory page buffer includes a particular number of data blocks, a data stream that includes a plurality of pages;

a plurality of memory circuits; and a memory controller circuit coupled to each memory circuit of the plurality of memory circuits via a respective one of a plurality of communication channels, wherein the memory controller circuit is configured to:

receive a first page of the plurality of pages from the particular processing circuit, wherein the first page includes the particular number of data blocks;

determine that a storage capacity of the memory page buffer does not align with a capacity of the plurality of communication channels;

distribute the first page of data blocks among the plurality of memory circuits using a first series of memory accesses, initiating a first one of the first series via a particular one of the plurality of communication channels;

receive a second page of the plurality of pages from the particular processing circuit, wherein the second page includes one or more data blocks; and distribute the one or more data blocks among the plurality of memory circuits using a second series of memory accesses, initiating a first one of the second series of memory accesses via a different one of the plurality of communication channels.

19. The design information of claim 18, wherein the particular processing circuit is further configured to allocate a particular amount of memory space for a plurality of the data blocks in the data stream regardless of an amount of data included in a given data block.

20. The design information of claim 19, wherein the memory controller circuit is further configured to store data blocks of the first and second pages into the plurality of memory circuits such that a respective data block is transmitted via each communication channel before a second data block is transmitted via any one of the communication channels.

* * * * *